Nov. 9, 1948.  J. F. MOLLOY  2,453,450
PRESSURE CONTROLLED SELF-CLOSING VALVE
Filed June 24, 1946

INVENTOR.
JAMES F. MOLLOY
BY
ATTORNEY

Patented Nov. 9, 1948

2,453,450

UNITED STATES PATENT OFFICE 2,453,450

PRESSURE CONTROLLED SELF-CLOSING VALVE

James F. Molloy, Oakland, Calif.

Application June 24, 1946, Serial No. 678,823

2 Claims. (Cl. 137—139)

This invention relates to pressure controlled self-closing valves and more particularly to means for selectively stopping the closing of such valves.

Among the objects of this invention is the provision of an automatically self-closing valve having internal means for manually continuing the flow through the valve when desirable.

Another object is the provision of a valve that may be opened to full capacity with the minimum of manual effort, and that will automatically close after a timed interval.

Another object is the introduction of a simple stop means in the manual control that will lock the valve open, that may be included or omitted from the general structure.

Other objects and advantages will appear as the description proceeds. In the specification and drawings the invention is shown in its preferred form. But it is to be understood that it is not limited to this form; because it may be embodied in modifications within the spirit of the invention as defined in the claims following the description.

Figure 1:
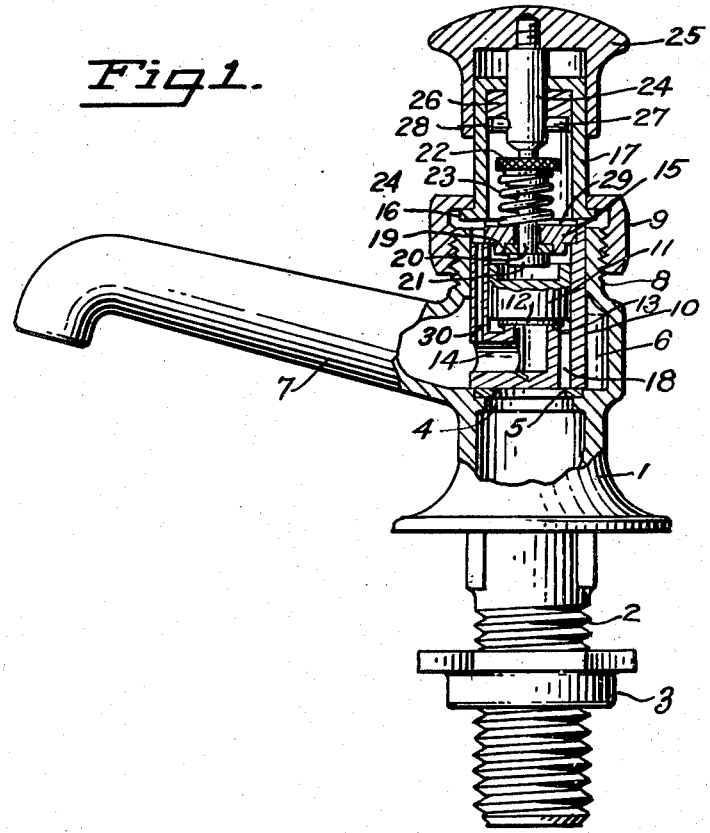
Fig. 1, is a vertical section of a self-closing valve having the stop mechanism included therein, in accordance with this invention.
Figure 2:
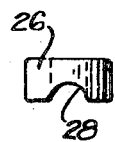
Fig. 2, is a detail in side elevation of the cam insert of the stop mechanism.
Figure 3:
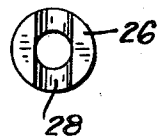
Fig. 3 is a detail in end elevation of the cam insert of the stop mechanism.

In detail the structure shown in Fig. 1 comprises the valve body 1, having the threaded inlet pipe 2 adapted to be connected with a water or other fluid service pipe and having the running nut 3 for attaching the faucet to the basin or other fixture, in the usual manner.

The body has the internal flange 4 upon which the annular gasket 5 rests within the enlarged chamber 6, having the outlet spout 7. The cylindrical neck 8, is externally threaded to receive the sleeve coupling 9 threaded thereon. The cylindrical block 10 fits snugly within the neck 8 and bears against the gasket 5. This block is centrally bored to form a cylinder within which the piston valve 11 rises and falls. This piston has a soft valve 12, closing the valve seat 13 within the block and closing the angular outlet 14 discharging into the neck 7.

The annular disk 15 rests on top of the block 10, closing the cylinder above the piston 11. This disk 15 is forced downward by the flange 16 on the cap 17 overhung by the sleeve 9 and forced downward thereby to seal the base of the block against the gasket 5, except for a series of vertical holes such as 18, surrounding the outlet 14, and leading into the internal pressure cylinder beneath the piston 11.

The disk 15 has a soft valve seat 19 surrounding a central opening guiding the stem 20 of the vent valve 21, seating against the soft seat 19. This stem extends upward above the disk and has the knurled nut 22 threaded thereon for applying tension to the interposed spring 23 bearing against the disk 15, to normally seat the vent valve 21.

The top of the cap 19 guides the stud 24 of the push button 25, telescoping over the cap 17. The plug stop 26 is forced into the top of the cap 17, where it is frictionally held against rotation. The stud 24 has the transverse pin 27, engaging the transverse slot 28 in the stop 26. This stop and the pin 27 are preferably composed of stainless steel or a similar hard non-corrosive metal.

This invention operates substantially as follows: The water under pressure entering at 2, passes upward at 18, seeps past the piston 11 and builds up pressure between the top of the piston and the underside of the disk beneath the valve 21. This overhead service presure acting against a greater area than is exposed beneath the piston, forces the valve 12 tightly against the seat at 13 and maintains the outlet 14 closed against outflow of water.

When the button 25 is depressed the stud 24 forces the stem 20 down and opens the vent valve at 20. This releases the pressure impounded above the piston 11, and the impounded water escapes across the transverse groove 29 and down the suction bypass 30 to the outlet 14. Release of the impounded pressure above permits the piston 11 to rise and open the valve at 13 and the water flows through the outlet 14 to the spout 7. This flow creates a suction on the bypass 30.

Release of the push button 25 permits the valve 21 to again seat. This causes pressure to again slowly accumulate above the piston 11, until it is again seated against the top of the outlet 14 and stops the flow of water to the spout 7. During this interval of impounding pressure above the piston 11, by seepage past the piston, the water continues to flow at the spout 7.

This interval is determined by the clearance between the piston 11 and the cylinder bore diameter in the block 10 and directly by the length of the piston. The tolerance in fabricating the cylinder bore in production is constant so that the time interval may be changed by selecting a piston suitable in length. Generally, a fixed time interval is desired especially in public convenience stations. Because this valve design maintains a constant time interval the need for adjustment of the time interval after installation is eliminated.

The particular function of the lock mechanism 26, 27, is to adapt the self-closing valve to use for filling bath tubs, sinks, and similar functions to avoid the necessity of applying continued downward pressure on the button 25 by hand. Continuous flow is accomplished by rotating this button one-quarter turn in either direction. This causes the pin 27 to ride out of the slot 28 and depress the valve stem 20 and maintain the vent valve at 21 open, permitting the piston 11 to be held up by the pressure flowing in at 18. The self-closing of the valve at 13 results when the button is again rotated one-quarter turn to restore the pin 27 to the slot 28, which closes the valve at 21, causing pressure to again build up above the piston 11. The tension of the spring 23 is just enough to support the button assembly 24, 25 in the elevated position as shown, so that it may be depressed with the minimum of manual effort, by adjusting the nut 22 controlling the tension of the spring.

The structure shown is sturdy, simple and easily accessible by unscrewing the sleeve coupling 9, for cleaning and replacing parts. The atmospheric bypass at 30, prevents seepage of water upward into the cap 17, because of the small volume of water impounded above the piston 11. The floating condition of this piston during the closing period, prevents water hammer and noisy operation in the closing interval.

Having fully described this invention and its mode of operation what I claim and desire to secure by Letters Patent is:

1. A valve in the class described, comprising a body with an inlet and an outlet; a block in said body having a pressure chamber open to said inlet and a base sealing said inlet and having a stop valve seat in its upper portion open to said outlet in said body; a disk closing the top of said pressure chamber and having a spring seated vent valve therein with a stem projecting above said disk; a cap on said body and bearing against said disk and communicating with the outlet from said body; a push button having a shank projecting through the top of said cap and contacting said valve stem below and having a transverse pin projecting therefrom; a stop in the top of said cap adapted to hold said button down when engaged by said pin and having a transverse slot adapted to release said button when engaged by said pin; and a stop valve in said pressure chamber closing said stop valve seat, when said vent valve stem is released.

2. A valve in the class described, comprising a body with an inlet and an outlet; a block interposed in said body between said inlet and outlet and having a pressure chamber therein; a disk closing said pressure chamber and having a spring seated vent valve therein with a stem projecting above said disk; a cap on said body and bearing against said disk; a cam stop in the top of said cap and having a transverse slot therein; a push button on said cap having a stud projecting through said stop and contacting said stem; a transverse pin in said stud engaging said slot and movable under said stop when said button is depressed and rotated; and a pressure seated valve closing said outlet from the body when said button is released.

JAMES F. MOLLOY.

REFERENCES CITED

The following references are of record in the file of this patent:

UNITED STATES PATENTS

| Number | Name | Date |
|---|---|---|
| 796,005 | O'Brien | Aug. 1, 1905 |
| 1,463,735 | Varrieur | July 31, 1923 |
| 1,714,591 | Darrow | May 28, 1929 |
| 1,888,130 | Huffman | Nov. 15, 1932 |
| 2,324,946 | Molloy | Oct. 8, 1943 |